(12) United States Patent
Magno et al.

(10) Patent No.: US 8,357,427 B2
(45) Date of Patent: Jan. 22, 2013

(54) PREPARATION METHOD FOR A PARTIALLY COATED MONOLITH

(75) Inventors: Scott Allen Magno, South Lyon, MI (US); Ralph Albert Dalla Betta, Mountainview, CA (US); Bret Robert Armanini, Dublin, CA (US); David R. Sheridan, Menlo Park, CA (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 874 days.

(21) Appl. No.: 12/369,780

(22) Filed: Feb. 12, 2009

(65) Prior Publication Data
US 2010/0203238 A1 Aug. 12, 2010

(51) Int. Cl.
- B05D 7/22 (2006.01)
- B05D 3/12 (2006.01)
- B05D 1/32 (2006.01)
- B32B 3/00 (2006.01)
- B21D 39/00 (2006.01)

(52) U.S. Cl. ........ 427/239; 427/178; 427/282; 427/287; 29/890; 428/59; 428/593

(58) Field of Classification Search .......... 427/177–178, 427/230, 239, 282, 287, 430.1, 435; 423/213.2, 423/213.5; 502/339; 29/890; 428/59, 593
See application file for complete search history.

(56) References Cited

U.S. PATENT DOCUMENTS

| | | | |
|---|---|---|---|
| 4,557,682 A | 12/1985 | Montierth | |
| 4,576,774 A * | 3/1986 | Hazard et al. | 264/267 |
| 5,082,167 A | 1/1992 | Sadano et al. | |
| 5,250,489 A | 10/1993 | Dalla Betta et al. | |
| 5,512,250 A | 4/1996 | Betta et al. | |
| 5,820,835 A * | 10/1998 | Sheller et al. | 422/180 |
| 7,147,892 B2 | 12/2006 | Aderhold et al. | |
| 7,240,483 B2 | 7/2007 | Cizeron et al. | |
| 7,309,370 B2 | 12/2007 | Kudo et al. | |
| 2001/0004832 A1* | 6/2001 | Hanaki et al. | 60/286 |
| 2002/0042344 A1 | 4/2002 | Kondo et al. | |
| 2002/0169077 A1 | 11/2002 | Bae et al. | |
| 2003/0044520 A1* | 3/2003 | Kiessling et al. | 427/79 |
| 2003/0075590 A1 | 4/2003 | Caspar et al. | |
| 2006/0029526 A1* | 2/2006 | Watanabe et al. | 422/177 |
| 2007/0116870 A1* | 5/2007 | Dettling et al. | 427/230 |
| 2007/0122318 A1 | 5/2007 | Habeger et al. | |
| 2007/0128354 A1 | 6/2007 | Suzuki et al. | |
| 2010/0093527 A1 | 4/2010 | Hasselmann | |

OTHER PUBLICATIONS

International Search Report and Opinion for related filing PCT/IB2010/000271.

* cited by examiner

Primary Examiner — James Lin
(74) Attorney, Agent, or Firm — Paul V. Keller

(57) ABSTRACT

Processes are provided for making partially coated monolith catalysts that are useful, for example, as pre-combustor catalysts for diesel exhaust aftertreatment. Monolith substrates are provided with interconnectivity and/or temporary barriers that allow from about 10 to about 90% of the monolith channels to be coated after the monolith substrate is assembled without having to carefully pick out among a large number of openings which ones to inject into or which ones to plug. The invention includes options of injecting into a multipath monolith substrate and of emplacing blocking material during monolith construction. Either catalyst coating material or coat-blocking material can be injected. Blocking materials allow the use of machinery for ordinarily non-selective processes, such as machinery for dip coating. Both multipath injections and pre-placed barriers can be used in a single partial coating process.

18 Claims, 10 Drawing Sheets

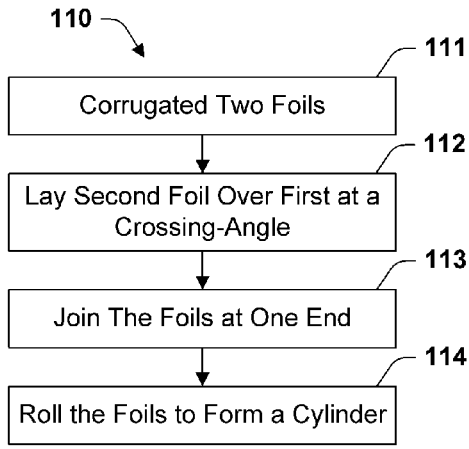

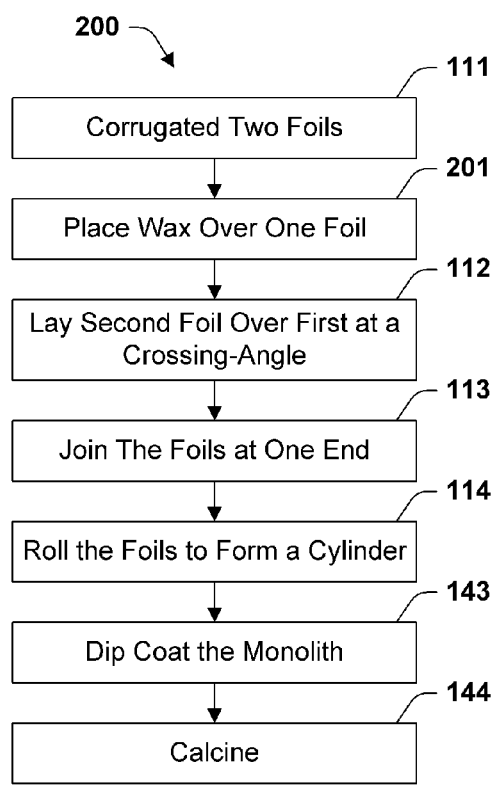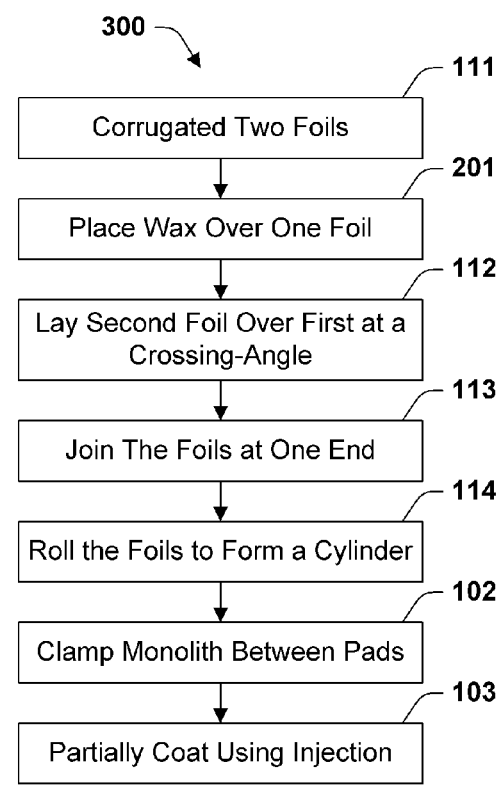
Fig. 18
Fig. 19

PREPARATION METHOD FOR A PARTIALLY COATED MONOLITH

FIELD OF THE INVENTION

The present invention relates to making monolithic catalysts in which only a fraction of the channel surfaces are coated with catalyst and especially to making pre-combustor catalysts for use in vehicle exhaust treatment systems.

BACKGROUND

Heterogeneous catalysis is the process of catalyzing a reaction of reagents in one phase, typically a fluid phase, using a catalyst in another phase, typically a solid phase. Effective heterogeneous catalysis requires good contacting between the reagents and the catalyst.

Catalytic converters, which operate through heterogeneous catalysis, have been used by the automobile industry for exhaust aftertreatment since the early 1970s. The first catalytic converters used catalysts supported on pellets beds packed into containers. With these packed beds, it was difficult to keep back pressure within engine tolerances and the pellets tended to degrade over time.

Monolith catalysts have since replaced packed beds in automobile exhaust treatment systems. In a monolith catalyst, the catalytic material is disposed on surfaces in an array of longitudinally oriented channels. A honeycomb is a typical monolith structure. The overall shape of the array gave rise to the term monolith. The structured orientation of the channels results in a reduced pressure drop for a given degree of exhaust-catalyst contacting in comparison with packed beds. The cohesive monolith structure resists degradation better than packed bed catalysts.

Monolith catalyst substrates are generally either ceramic or metallic. Ceramic substrates can be extruded into monolith shapes. Metallic monoliths are formed from metal foils. Typically, at least one of the foils is textured, for example corrugated. The foils can be stacked, folded, or rolled to form a monolith structure. For example, a corrugated foil and a flat foil can be laid one over the other, joined at one end, and rolled to form the monolith structure illustrated by FIG. 1.

In most monolith applications, the surfaces of the monolith channels are entirely coated with catalyst. Catalyst can be coated by dipping the monolith in catalyst slurry (or sol), drawing or pouring catalyst slurry through the monolith channels, or spraying catalyst slurry onto sheets or foils prior to assembling them into the monolith.

In some applications, it is preferred or necessary to coat only a fraction of the monolith channels. U.S. Pat. No. 7,240,483 describes a pre-combustion catalyst that preferably has catalyst coated on only a fraction of its channels. The pre-combustion catalyst is designed to promote low temperature start-up of a fuel reformer and to increase fuel reforming efficiency. The pre-combustion catalyst operates by combusting a first portion of injected fuel while vaporizing a remaining portion of the fuel. Heat released by combustion provides the heat of vaporization. Vaporized fuel and exhaust leaving the pre-combustor are allowed to mix prior to entering the fuel reformer. Vaporizing the fuel prior to mixing makes mixing more effective. The improvement in uniformity promotes efficient reformate production and reduces hot spots in the fuel reformer.

Coating only a fraction of the pre-combustor channels ameliorates the occurrence of hot spots within the pre-combustor, prevents the pre-combustor from overheating, and prevents more than the desired fuel fraction from combusting in the pre-combustor. The pre-combustor is required to operate under a wide range of conditions and with poorly mixed feeds. Heat generated in coated channels is spread by heat transfer to fuel and exhaust passing through adjacent uncoated channels. Overall fuel conversion and heat generation are generally limited by having only the fraction of fuel entering the coated channels contact the catalyst. The uncoated channels are fluidly isolated from the coated channels; the fraction of fuel entering those channels is vaporized but does not contact the catalyst and will not combust absent very high temperatures.

In the prior art, pre-combustor catalysts with only a fraction of the channels coated have been prepared by spray-coating metal sheets on one side only. Folding the coated face onto itself, or laying two sheets together with the coated sides facing each other, followed by rolling, provides a suitable structure. Spray-coating, however, is difficult to carry out on a production scale.

Processes for coating alternate channels of diesel particulate filters do not provide attractive alternatives for making pre-combustor catalysts. On a commercial scale, these processes involve precast tools that pick out alternate channels of ceramic substrates. Pre-combustor catalysts are preferably made from metal substrates. Metal provides advantages in terms of allowing for structurally sound thin monolith walls having low thermal inertia and high thermal conductivity. Unlike ceramic monoliths, metal monoliths are not made by extrusion and the exact location of the channels varies significantly from sample to sample. Picking out alternate channels of metal monoliths and directing catalyst into just those channels would be difficult.

The problem addressed by the inventors was to develop a process suitable for preparing partially coated metallic-substrate monolith catalysts that better lends itself to commercial production than the prior art spray-coating process.

SUMMARY

The invention solves the foregoing problem. According to the invention, monolith substrates are provided with interconnectivity and/or temporary barriers that allow from about 10 to about 90% of the monolith channels to be coated after the monolith substrate is assembled without having to carefully pick out among a large number of openings which ones to inject into or which ones to plug. The invention includes injection process embodiments, non-selective coating process embodiments, and embodiments that combine an injection process with a non-selective coating process.

For the injection process embodiments, the number of volumes within the monolith that are separated by metal foils is reduced by layering the foils in a manner that provides multipath monolith channels. For example, multipath channels can be formed by laying adjacent corrugated foil layers at crossing angles. The multipath structure allows injection processes to be carried out using just one or a small number of injection ports.

Non-selective coating process embodiments use temporary barriers. Temporary barrier can be formed by emplacing barrier material within a monolith as the monolith is formed or by injecting barrier material into a formed monolith. The injection process requires a multipath monolith, but the emplacement process does not. With temporary barriers in place, a fraction of the monolith channels can be selectively coated using what would normally be a non-selective process such as dipping the monolith in a coating solution. Temporary barriers can be removed after the catalyst coating is applied.

For example, temporary barriers consisting of wax can be removed by melting and burning.

One embodiment of the invention is a method of manufacturing a partially catalyst-coated metal-substrate monolith using a multipath monolith substrate. The substrate is the product of a process that begins with one or more metal foils. The foils are folded, stacked, or rolled to form a layered structure having open spaces between layers and an overall monolith shape. One of the foils may be textured to provide the open spaces, but alternatively the space is maintained by a porous material placed between adjacent layers of foil. After the monolith is assembled, its ends are closed off by pressing pads against them. Material is injected into the interior of the monolith through one or a small number of injection ports in the pads. The ports provide access to channels that encompass from about 10 percent to a maximum of about 90 percent of the open space between layers. The surfaces of the injected space are contacted by the injected material. Depending on what material is injected, the monolith may be partially coated by catalyst coating just the surface contacted by the injected material or by using the injected material to prevent some surfaces from being coated.

Another embodiment of the invention is a method of manufacturing a partially catalyst-coated monolith using temporary barrier material to limit the surface that is coated. The method includes forming a monolith using one or more sheets. The sheets are folded, stacked, or rolled to form a layered structure having an overall monolith shape. Texture in one of the sheets or a porous material included in the construction creates space between the layers. Prior to forming the monolith, a temporary barrier material is emplaced adjacent at least one of the sheets. The emplacement configures the temporary barrier material to limit access to some of the space between layers in the formed monolith. The formed monolith is catalyst coated. While coating is underway, the temporary barrier material prevents the coating material from reaching a portion of the space between layers. This limits the extent of coating to from about 10 percent to about 90 percent of the total space between layers. After applying the catalyst coating, the temporary barrier material is removed from the monolith.

The primary purpose of this summary has been to present certain of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will be conveyed to one of ordinary skill in the art by the following detailed description together with the drawings. The specifics disclosed herein may be generalized, narrowed, and combined in various ways with the ultimate statement of what the inventors claim as their invention being reserved for the claims that follow.

BRIEF DESCRIPTION OF THE DRAWINGS

FIG. 2 is a flow diagram for an exemplary process of making a multipath monolith using corrugated foils laid as shown in FIGS. 7 and 8.

FIG. 3 is a flow diagram for an exemplary process of making a multipath monolith using wire mesh to create open space between foil layers as shown in FIGS. 15 and 16.

FIG. 4 is a flow diagram of an exemplary partial coating process that uses injection into a multipath monolith.

FIG. 5 is a flow diagram of an exemplary partial coating process that uses catalyst sol injection.

FIG. 6 is a flow diagram of an exemplary partial coating process that uses wax injection.

FIG. 18 is a flow diagram for a partial coating process that uses a monolith having built-in temporary barriers.

FIG. 19 is a flow diagram for a partial coating process that uses both multipath injection and a monolith having built-in temporary barriers.

DETAILED DESCRIPTION

Partial Coating by Injection into a Multipath Monolith Substrate

FIG. 4 illustrates a process flow diagram for one embodiment of the invention, which is a process 100 of making a partially coated monolith catalyst. The first step 101 is obtaining a multipath monolith substrate.

A monolith substrate is a catalyst support structure having adjacently arrayed and substantially longitudinally oriented fluid channels. The inlets of the channels are at one end of the substrate and the outlets of the channels are at a distal end. The outermost perimeter of the monolith between the inlet and outlet ends is enclosed. The channels are separated by thin walls internal to the monolith.

Figure 1:
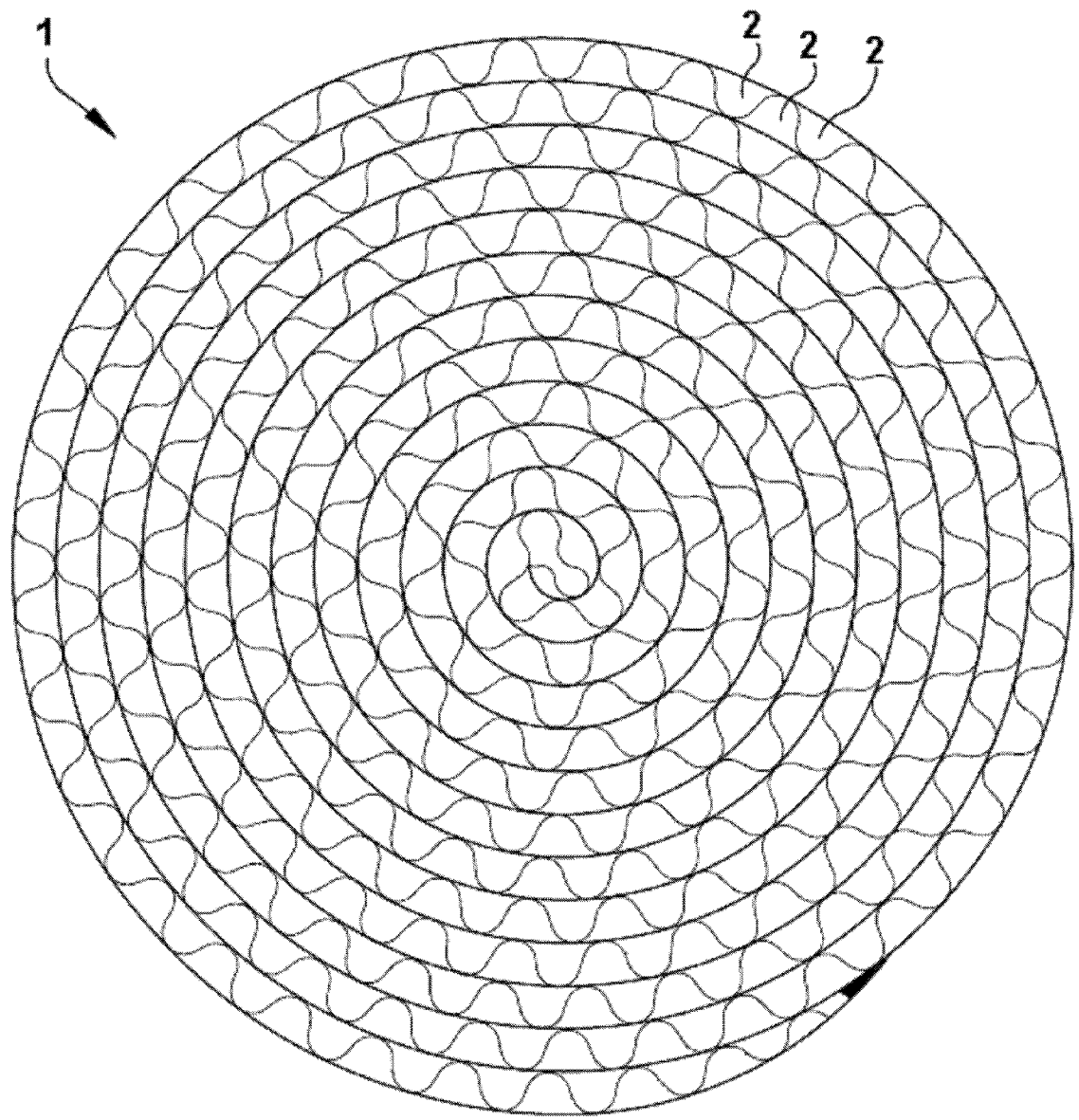
FIG. 1 is an image of a spiral wound monolith that does not have multipath structure.
Figure 10:
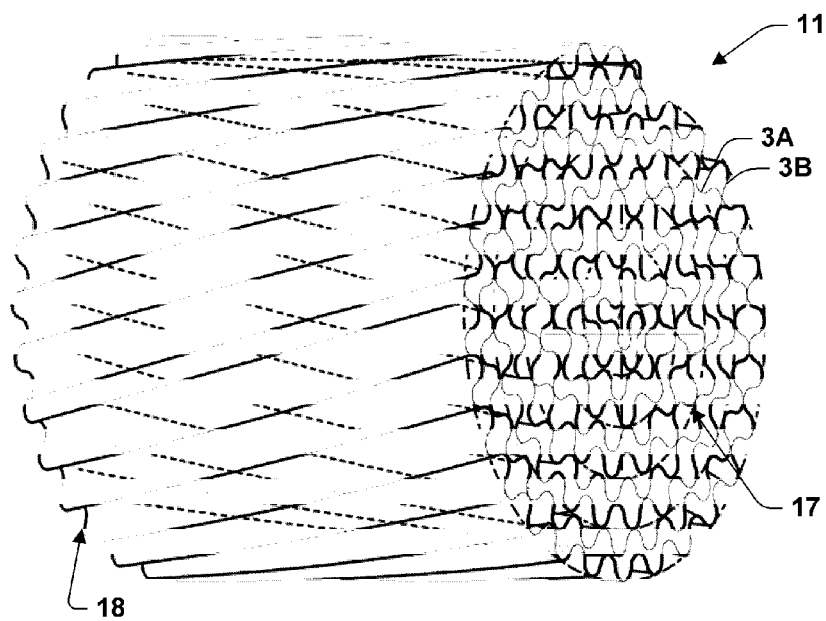
FIG. 10 is an illustration of a spiral-wound multipath monolith resulting from rolling the folded foil illustrated by FIG. 9.
Figure 11:
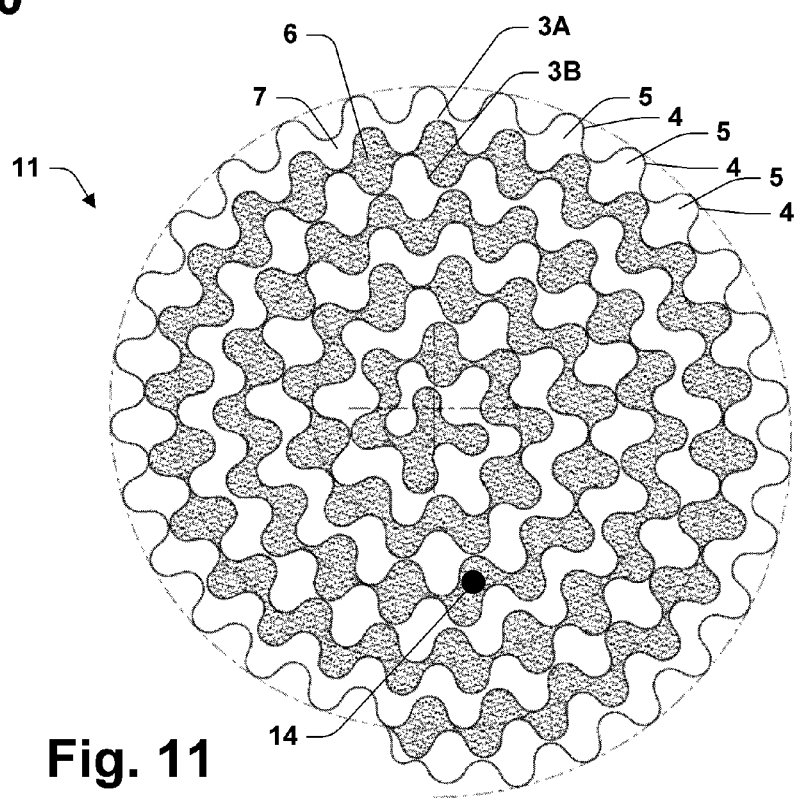
FIG. 11 is an end view of the monolith of FIG. 10. The darkened area highlights the interconnectivity of a void space within the monolith. The broken line highlights the alignment of the layers. The black dot indicates a preferred injection point.

Whereas in most monoliths the channels are very numerous, axially symmetric, and fluidly isolated from one another, a multipath monolith is generally not quite axially symmetric and contains many fewer fluidly isolated internal regions. FIG. 1 illustrates a conventional monolith substrate 1, while FIGS. 10 and 11 illustrate an exemplary multipath monolith substrate 11. The monolith 1 has an array of bell-shaped openings 2, each of which is closed off from all adjacent openings 2. The channel shapes defined by these openings are maintained through the length of the monolith 1, whereby the number of fluidly isolated channels through the monolith 1 equals the number openings 2. There are several hundred openings each providing less than 1% of the internal surface area within the monolith 1.

The monolith 11 is considered multipath in that fluid flowing along paths 5 defined by corrugations 4 mixes with fluid flowing along adjacent paths 5 defined by adjacent corrugations 4. The connectivity extends in a spiral pattern as illustrated by the shaded area of FIG. 11. The spirally shaped interconnected volume 6 is inter-wound with another spirally shaped interconnected volume 7. The volumes 6 and 7 are fluidly isolated from one another within the monolith substrate 11. The adjective "interconnected" means that all parts of the volume are accessible to all others through open internal pathways. This definition excludes flow out the ends 17 and 18 and back into the monolith 11 from consideration. The volume 6 is shaded to distinguish it from the volume 7.

Figure 7:
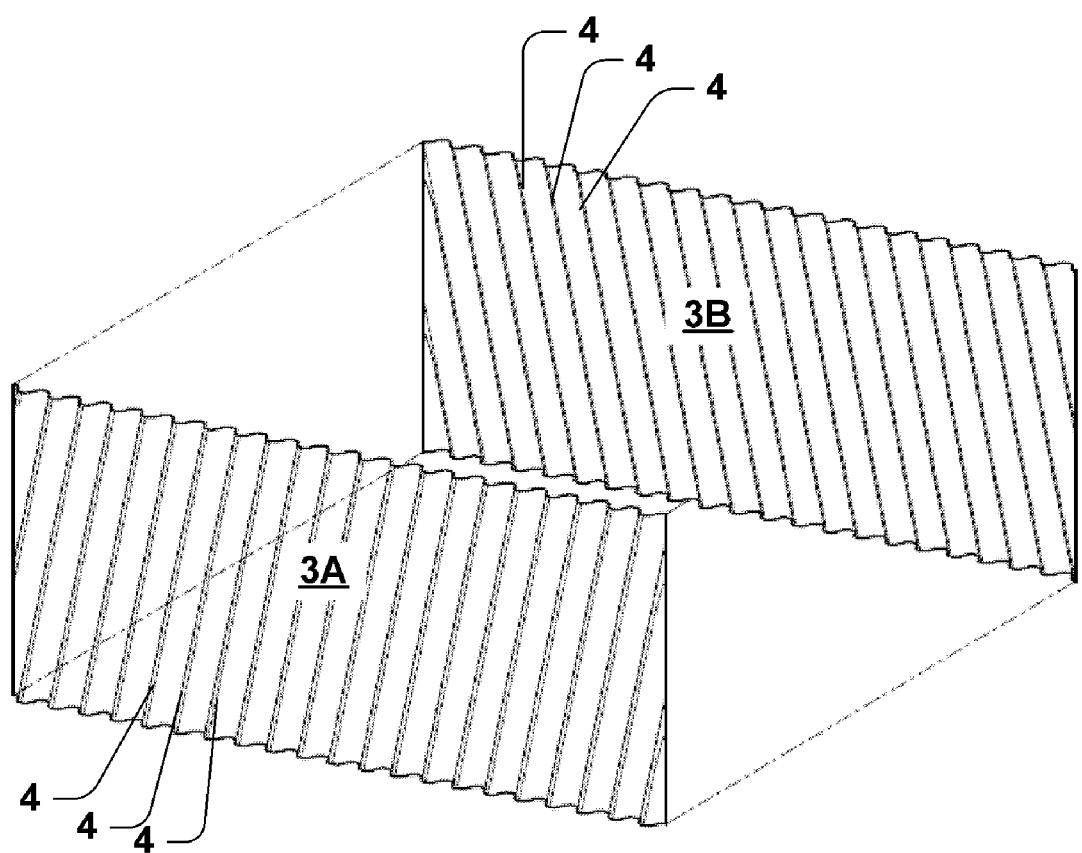
FIG. 7 is an illustration of the foils of FIG. 6 being aligned and laid against each other.

FIG. 2 provides a process flow diagram of an exemplary method 110 of making a multipath monolith substrate similar to the substrate 11. Method 110 begins by forming two corrugated foils 3A and 3B (step 111). The corrugated foils 3A and 3B are laid one over the others with the corrugations 4 at crossing angles (step 112) as illustrated by FIG. 7. The foils 3 are joined at one end (step 113), then rolled to form a cylinder (step 114). Corrugated foils are joined in and by crushing an end portion flat and usually brazing. This obtains a multipath monolith like the monolith 11 illustrated by FIGS. 10 and 11, except that the monolith 11 does not show the crushing and brazing of two separate foils at its center. That is because of the slightly different way that the monolith 11 is formed, which will now be described.

Figure 8:
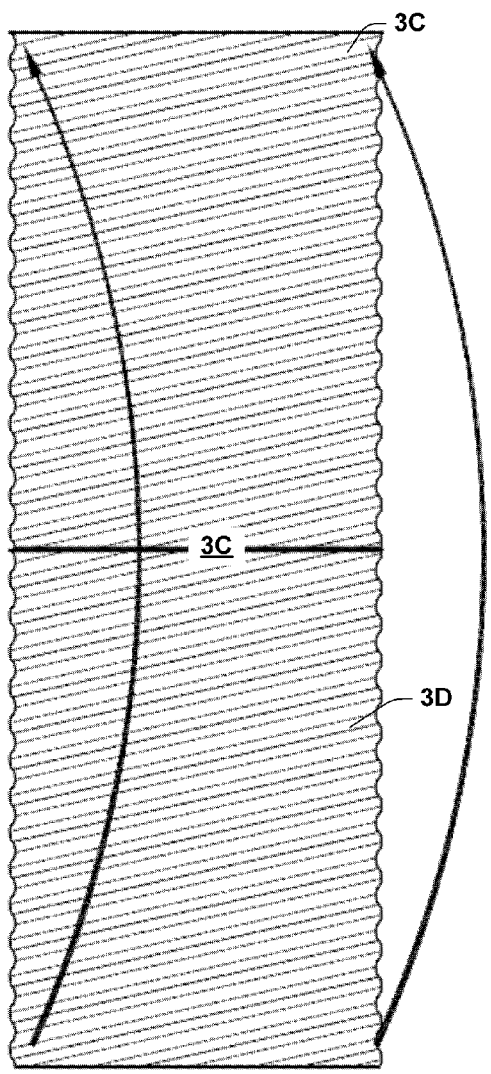
FIG. 8 illustrates a single sheet of corrugated foil being folded.
Figure 9:
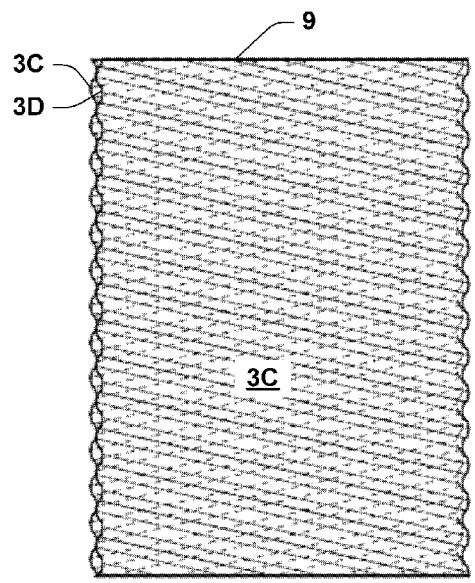
FIG. 9 illustrates the foil of FIG. 8 after it has been folded onto itself.

FIGS. 8 and 9 illustrate another method of making a multipath monolith. The two halves 3C and 3D of a single corrugated foil 3E are folded one over the other as illustrated by FIGS. 8 and 9. The folded halves 3C and 3-D are then rolled to form a cylinder as in step 114. The ends 9 are flattened and brazed to the outer perimeter of the cylinder to seal off the interior. The result is the multipath monolith 11 illustrated by FIGS. 10 and 11.

There are many other methods of making multipath monoliths. A multipath monolith substrate can be formed by stacking a large number of corrugated foils 3, stacked so that adjacent foils have their corrugations at angles to one another, and cutting the entire stack endwise to form a monolith shape. The method 110 is preferred over this alternate method because the method 110 results in many fewer fluidly isolated regions.

Figure 12:
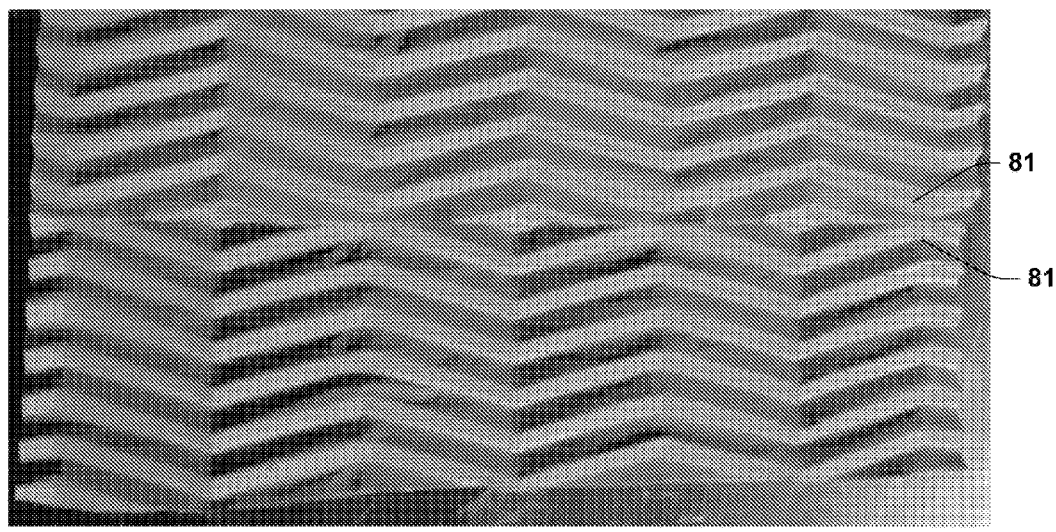
FIG. 12 is an image of metal foils corrugated in a herringbone pattern and laid against each other in a non-meshing fashion.
Figure 13:
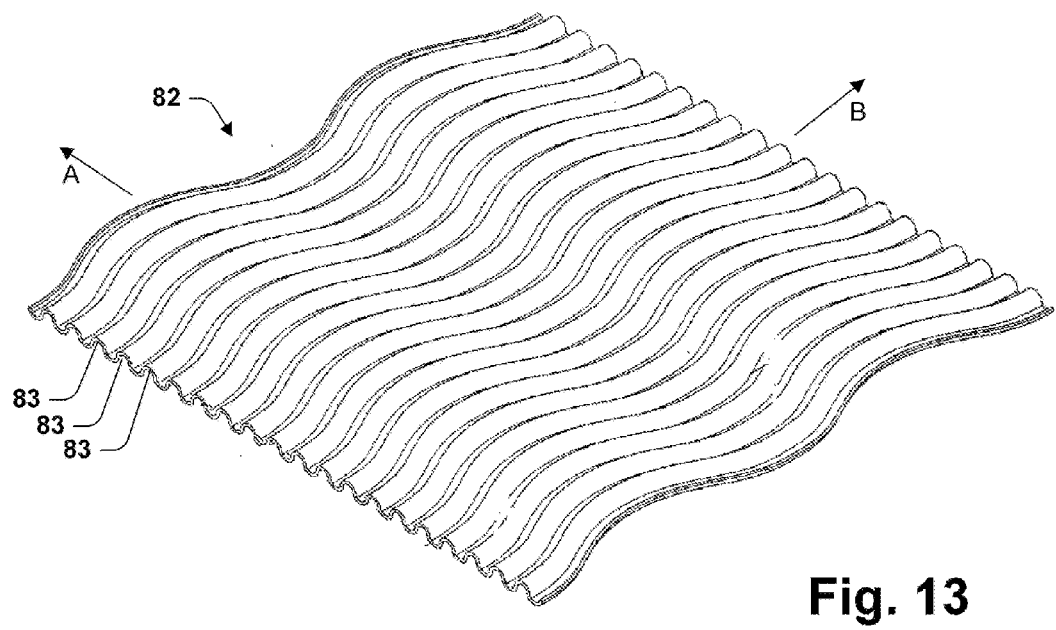
FIG. 13 is an illustration of a metal foil corrugated with one pattern in a first direction and another pattern in a perpendicular direction.

FIGS. 12 and 13 provide further examples of building blocks for multipath monoliths. FIG. 12 illustrates two metal foils 81 having a herringbone pattern of corrugations. The two of the foils 81 can be stacked and rolled together like the corrugated foils 3A and 3B to form a multipath monolith similar to the monolith 11. FIG. 13 illustrates a metal foil 82 that has two corrugation patterns oriented in perpendicular directions A and B. The foil 82 is sinusoidally corrugated with a short period in direction A and with a longer period in direction B. The corrugations in the second direction prevent the ridges 83 of the corrugations in direction A from being aligned in one plane. Rolling a foil corrugated in this manner together with a flat foil will form a multipath monolith. This particular configuration, however, is not recommended for the foil illustrated by FIG. 13 because the injection will not flow easily through the entire volume: the spaces formed where the high-frequency corrugations run close to the flat plate are too narrow to allow for easy distribution of injected material. This example will work better if the two patterns of corrugations are more similar in period and amplitude.

The foregoing examples are non-limiting with respect to methods of making multipath monoliths from foils. Notably, in conventional monoliths, for example the monolith 1, adjacent foils contact line-wise along axially oriented lines. In the various examples of multipath monoliths, the foils contact point-wise rather than line-wise, except where the foils are joined at their edges. The point-wise contact creates multi-path structures.

When two or more foils are rolled together, they are joined at their edges to close off separate flow spaces. The ends are joined by crushing out the corrugations and welding or sealing the ends together. This type of process is carried out first at the end from which rolling begins and then at the outside after the foils are rolled together.

Figure 14:
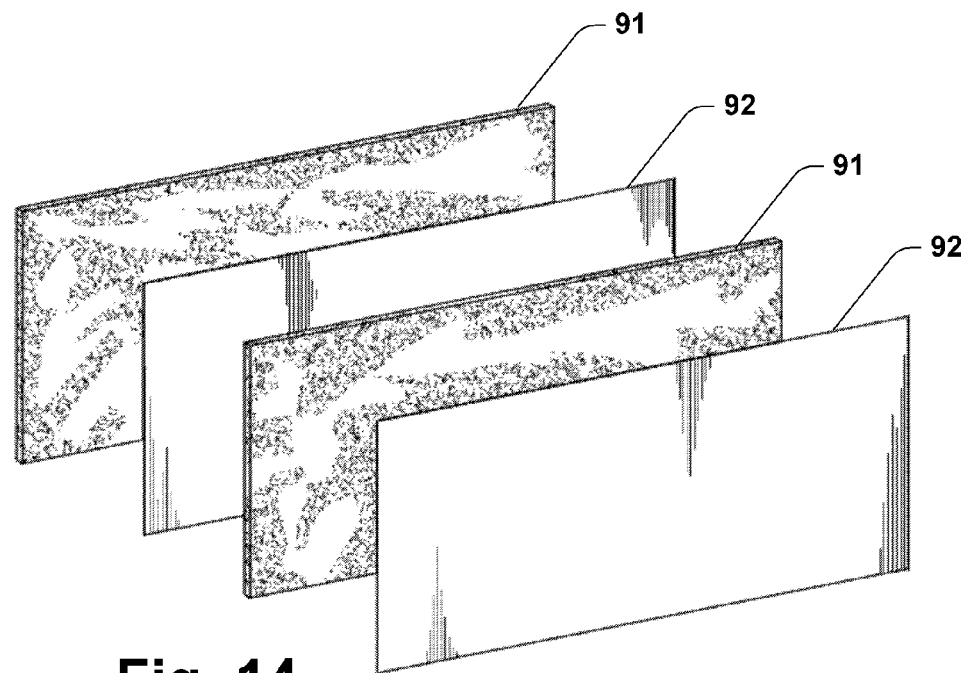
FIG. 14 is an illustration of wire mesh positioned between foils.
Figure 15:
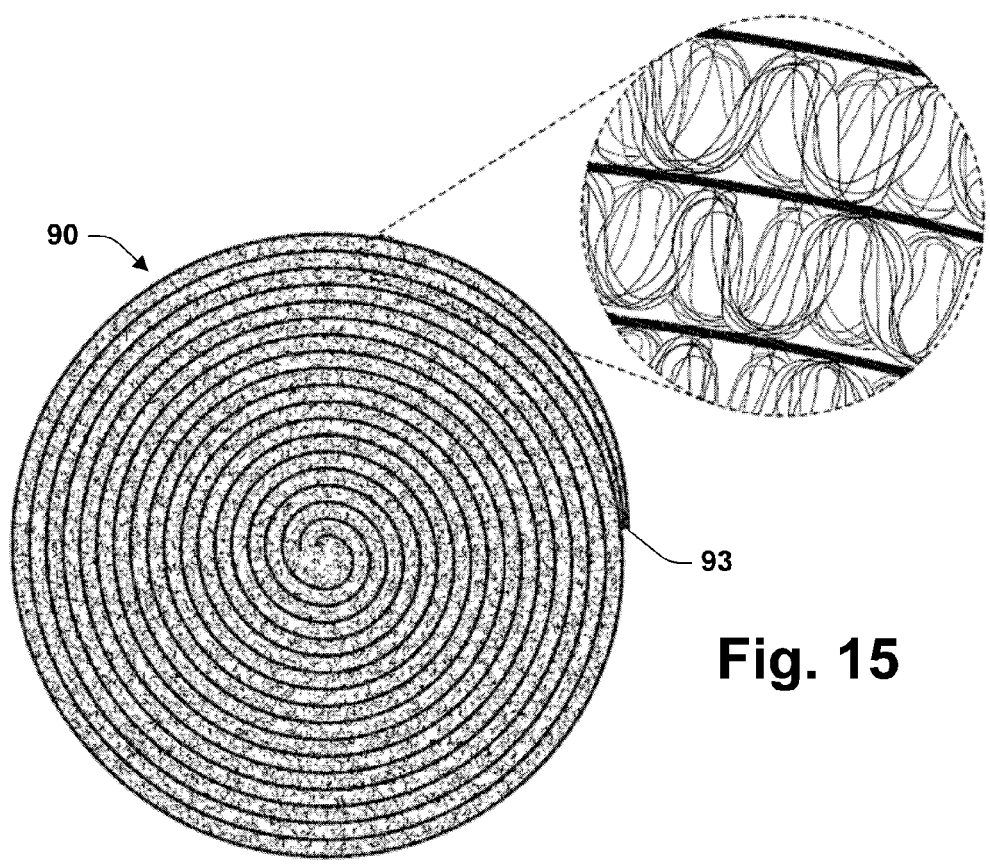
FIG. 15 illustrates the wire mesh and foils of FIG. 14 rolled into a monolith shape.

Texturing one or more of the foils and laying or folding the foils so the textures do not align creates open space between foil layers. A porous material placed between foil layers also creates open space between foil layers with or without texturing the foils. FIG. 3 provides a process flow diagram for a method 120 for making a multipath monolith with metal foil and wire mesh, which is a porous material. FIG. 14 illustrates the first step 121, which is stacking two meshes 91 and two foils 92 with alternating layers of foil and mesh. The foils are joined together at one end in step 122. The meshes 91 and foils 92 are rolled together to form a cylinder in step 123 as illustrated by FIG. 15. The outer edges of the foils 92 are joined to the perimeter of the monolith 90 at the point 93.

There are many other examples of multipath monolith substrates. The only requirements for a multipath monolith substrate are an overall monolith structure and interconnectivity of channels. For the partial coating process, it is also required that the interconnectivity divide the monolith into two or more isolated volumes. The isolated volumes are interconnected within their individual internal spaces, but the different volumes are fluidly isolated.

The multipath injection process coats surface corresponding to from about 10 to about 90% of the internal space within the monolith. To limit the number of injection points, from about 10 to about 90% of the internal space must be contained within a small number of the isolated volumes. The surfaces untouched by injection may be contained within a very large number of volumes, but preferably the entire region to be filled by injection is contained within one interconnected volume. If the injection is limited to four separate volumes, that is still a small number. Even ten might be considered a small number of volumes if ten volumes provide access to half the interior of the monolith. If ten regions provide access to just ten percent of the internal volume, then ten would not be considered a small number.

The examples provided thus far describe methods of creating monoliths with just two isolated volumes each having equal surface area. The number of volumes can be increased by adding additional sheets. For example rolling together three sheets having differing corrugation patterns that do not mesh can provide three separate volumes.

The surface areas and volumes of each separate region can be varied by using different corrugation patterns for different sheets. For example separate regions with differing surface areas and differing volumes can be obtained by stacking and rolling a flat foil, a foil with fine corrugations, another flat foil, and then a foil with coarse corrugations. The relative volumes of the regions can be manipulated by varying the ratio between the amplitudes of the different corrugation patterns. A larger amplitude will give a larger volume to the regions bounded by the sheet. The relative surface areas of the regions can be independently manipulated by varying the ratio between the periods (angles of bending) of the different corrugation patterns. A shorter period will provide more surface area to the regions bounded by the sheet.

The method 100 is not limited to any particular method of obtaining a multipath monolith. While some other embodiments of the invention require steps carried out prior to assembly of the monolith substrate, the method 100 can begin with a monolith substrate that may have uses in processes other than ones claimed here. Accordingly, a multipath monolith may be obtained by making one, by method 110 or 120 for example, or by acquiring one that is already made, if a source can be found.

Figure 16:
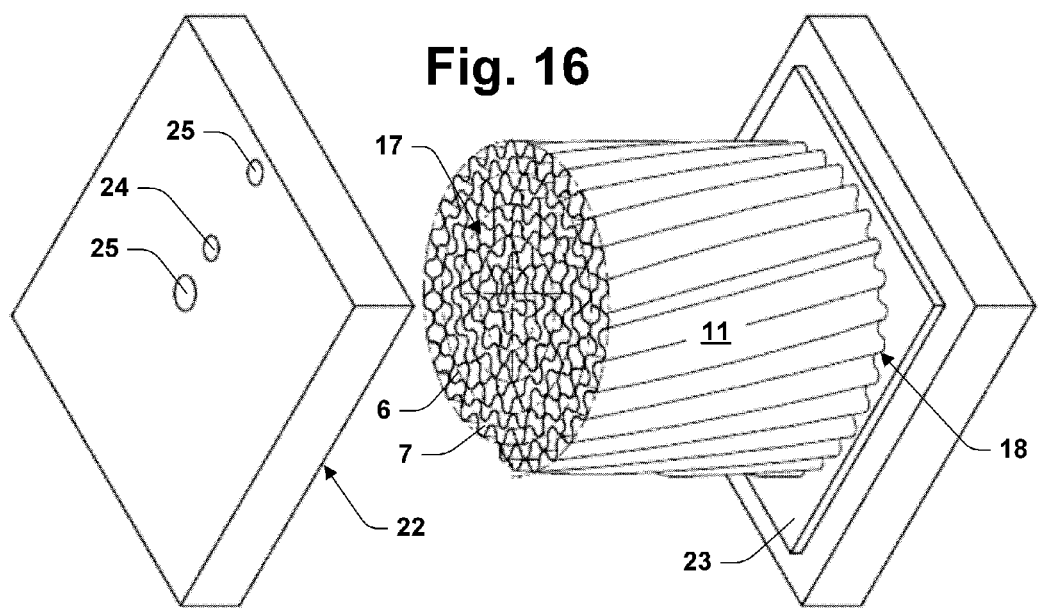
FIG. 16 illustrates a multipath monolith being clamped between pads according to the process of FIG. 4.
Figure 17:
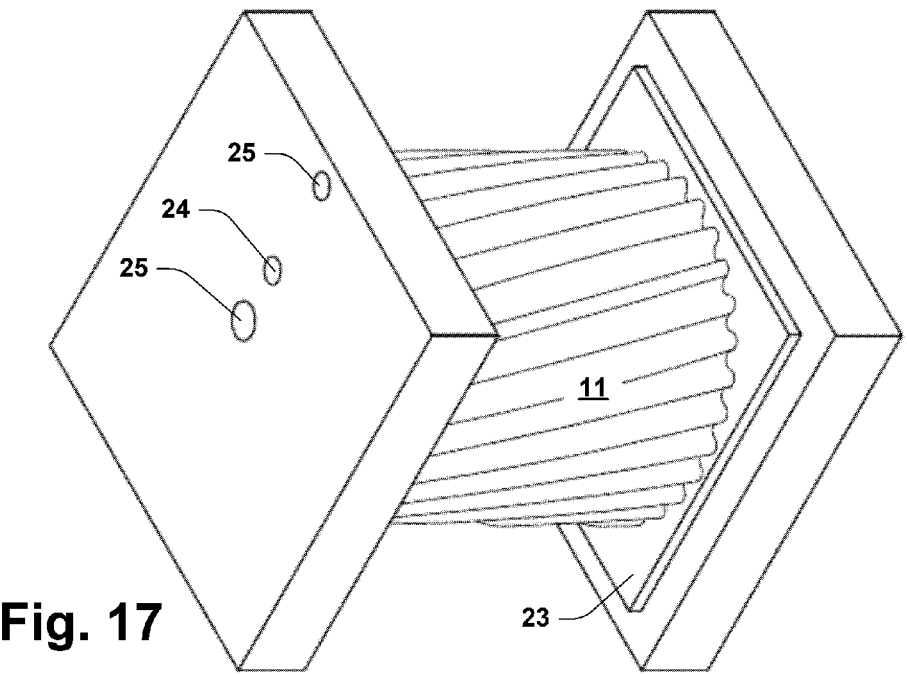
FIG. 17 illustrates a multipath monolith clamped between pads according to the process of FIG. 4.

The next step (102) in the method 100 is closing off (sealing) the ends of the monolith. Using the monolith substrate 11 for illustration, the ends 17 and 18 are sealed by pressing pads 22 and 23 against the ends as illustrated by FIGS. 16 and 17. Preferably, the monolith 11 is clamped between two pads 22 and 23 and applied pressure maintains sealing contact between the pads 22 and 23 and the open ends 17 and 18 of the volumes 6 and 7. The pads comprise a layer of pliable material with a rigid backing. The pliable material is selected for its ability to adapt to the non-uniformities of the monolith ends 17 and 18 and close them off. Resilient materials are preferred as resiliency facilitates closure of the ends 17 and 18 and removal and reuse of the pads 22 and 23, although it is conceivable to use an impressionable material lacking resiliency. Examples of suitable pad materials may be found among non-porous (closed-cell) foams and rubbers, with more specific examples including ECH (epichlorohydrin) foam, EVA (ethylene vinyl acetate) foam, Viton® (a fluoropolymer), buna-N® (an acrylonitrile butadiene copolymer), and hard rubbers. Closed cell foams are used as opposed to open cell foams to avoid leakage.

The next step (103) is to catalyst coat a limited part of the monolith substrate 11 using a process comprising injection. The injection will introduce the injected material into regions of the multipath substrate that comprise from about 10 to about 90% of the monolith's internal volume. Within the monolith the remaining volume is inaccessible from the injected regions. The injected material selectively contacts surfaces of the injected regions, the selectivity being to the exclusion of the inaccessible regions. The monolith will then be selectively coated with catalyst, the selectivity being determined at least in part by the distribution of the injected material. As will be made clearer from the examples given below, the steps of injection, contacting, and catalyst coating can be to some extent discrete or can occur simultaneously as a result of a single action, e.g., injecting a catalyst sol that contacts and coats the surfaces of the injected regions.

Typically, the injection of step 103 is carried out using tubes inserted through one or more injection ports 24 in the pad 22. A preferred injection port location is central to the volume accessed by the port. FIG. 16 and 17 illustrate injection port 24 at a central location 14 (see FIG. 11) for the volume 6. A central location is one that roughly minimizes the path length to the furthest extremity of the accessible volume. If more than one injection port 24 is used to inject a single interconnected volume, it is preferred that the two ports 24 be spaced to minimize the path length required to reach all parts of the volume from the nearest port 24.

The pad 22 is generally provided with exit ports 25 as well as injection ports 24. Exit ports 25 allow air to escape from the monolith 11, thereby reducing the pressure required to inject material into the monolith 11 and facilitating the uniform spread of injected material through the volume 6. Preferably, these ports 25 are located to access the volume 6 at points most distant in terms of internal path length from the injection points. FIG. 16 and 17 illustrates two exit ports 25 located at the most distant positions. For optimal flow, there is preferably at least one more exit port 25 than injection port 24 for each fluidly isolated volume being injected.

Limiting the pressure drop required to induce the injected material to enter and spread through the injected volume is a concern. The pressure drop can be reduced by increasing the number of injection ports 24, but preferably the number of injection ports 24 is kept to a minimum. Keeping the number of injection ports 24 to a minimum simplifies the connection of the monolith to the injection apparatus and facilitates the correct positioning of the injection ports 24. If the monolith contains only two separate interconnected volumes and each is equivalent to the other, a single injection port 24 can be used and there will be no possibility of incorrectly positioning it.

Injecting material into one or more interconnected regions isolated from others regions within a monolith provides selective contact of the injected material with a limited portion of the monolith's interior. The straightforward way to use this selectivity is to inject the catalyst to be coated so that it enters and coats just the regions to be coated. However there are more roundabout ways to use the selective contact provided by multipath injection to ultimately achieve a selective coating. One option is to inject a precursor that will selectively attract or attach a catalyst that can be provided in a subsequent non-selective contacting process. Another option is to inject a precursor that will block the injected volume or block the surfaces of the injected volume and then coat the monolith using what would normally be a non-selective process. FIGS. 5 and 6 provide process flow diagrams for two methods, 130 and 140, which are non-limiting examples of step 103, partially coating using injection.

Injection Option A: Catalyst Injection

In the method 130 shown in FIG. 5, the injected material is a catalyst sol. The first step (131) is to inject the sol through the injection ports 24. Preferably, the sol is injected by positive displacement with the volume displaced being matched to the internal volume of the monolith accessed by the ports 24.

In step 132, the monolith is removed from the pads. Excess sol is blown out of the monolith in step 133. Excess sol can also be drawn out using vacuum. In step 134, the monolith is calcined, which binds the catalyst coating.

In this example, positive displacement of a pre-determined volume provides all the required contacting. Other contacting methods can be used, where practical and necessary or desirable. For example, the monolith could be shaken or rotated with the ends sealed to disperse the sol and induce contacting.

One variation of the coating and contacting process is to recirculate the sol through the monolith as opposed to using positive displacement. Recirculation ensures good contacting. Another variation is to draw the sol out of the monolith using a vacuum while the monolith is still clamped between the pads. Drawing of this nature can facilitate the injection process as well as be used to draw out excess sol. In this latter variation step 133 comes before step 132.

A sol is a colloidal suspension of catalyst particles. Typical catalysts are precious metals such as Pt, Pd, and Rh. The catalysts are typically dispersed on high surface area metal oxide supports, such as $ZrO_2$ or $Al_2O_3$. A sol can be made by suspending the finely divided catalyst in water, optionally with a stabilizer and suitably adjusted pH. The injected material can also be a catalyst solution or another fluid form including the catalyst and a carrier.

The catalyst and carrier can be selected to reduce the pressure drop required for the injection process. Reducing the viscosity of the injected material facilitates injection. The viscosity of a catalyst sol can be reduced by making it into foam. A sol can be made into foam by adding a foaming agent to the sol and introducing gas to the sol to make it foam.
Injection option B: Volume Blocking Injection In the method 140, the injected material is a wax. Step 141 is to inject the wax. The wax functions to provide a barrier in later coating steps. Any material suited to forming temporary barriers can be used instead of wax. The temporary material may be injected as a liquid and allowed to harden or cure once in place. A hardening or curing process could be solidification or polymerization. The temporary barrier material blocks access to surfaces of the injected volume by filling the volume.

After the monolith 11 is removed from the pads 22 and 23 (step 142), the unblocked channels are coated by dipping the monolith in a catalyst sol (step 143). Other non-selective coating processes can be used instead of dip coating, such as drawing or pouring a coating mixture through the ends of the monolith. Drawing and pouring processes are nonselective if they are applied across an entire monolith face without attempting to pick out individual channels. A non-selective process can be any coating process that is non-selective with respect to which channels are coated absent the temporary barrier material. One advantage of method 140 is that it allows the catalyst to be applied by existing equipment designed to carry out non-selective catalyst coating. After coating, the wax or other temporary material is removed by a process such as heating to melt the wax, blowing out the melted wax, then burning out any remaining wax. In process 140, the remaining wax is burned off in the calcination step (144), which also functions to cure the catalyst coating.

Partial Coating Limited by Temporary Barriers Formed into a Monolith

The temporary barrier material can be introduced earlier in the process, eliminating the need for an injection step. FIG. 18 is a process flow diagram of an exemplary method 200 for forming a partially coated monolith using temporary barriers and a non-selective coating process. The method 200 contains many steps in common with method 100. The first five steps provide a monolith substrate with built in wax barriers. The monolith substrate for process 200 need not be a multipath monolith, although it can be. Because process 200 does not require a multi-path structure, it lends itself better to non flexible substrate materials that cannot be rolled. For example, a substrate for process 200 can be constructed by using textured sheets of ceramic in place of textured sheets of metal foil. The sheets can be stacked and cut to a monolith shape.

The first five steps of method 200 correspond to process 110 and step 101 of method 100, with the addition of a step 201 that introduces a temporary barrier material. Suitable materials are sufficiently pliable to form a sealing engagement between adjacent sheets. The material must also be sufficiently cohesive to stay in place. Optionally, the material can be susceptible to curing or hardening after the monolith is formed. The material must also be amenable to a removal process that can be carried out without affecting the catalyst coating. Wax and organic polymers can be burned off, but melting, etching, or dissolution processes may also be practicable, depending on the material used.

In step 201, the temporary barrier material is a soft wax, which is placed in a layer over the corrugated foils 3A. The other foil 3B is laid on top as in step 112 and the ends of the foils are joined as in step 113. When the foils 3A and 3B are rolled in step 114, the soft wax fills and blocks a space between foil layers corresponding to region 6. It should be appreciated that much the same effect could be achieved by placing the wax in bands that bound region 6 without filling it. The space between layers corresponding to region 7 is left unblocked and open to coating. The resulting structure is, in this example, identical to that obtained after step 142 of process 140. The wax eliminates the need for steps 102 and part of step 103. The remaining steps 143 and 144 are the same as for step 103 and are adapted to the same alternatives.

Higher viscosity materials can be laid between layers as compared to those materials that can be injected. Accordingly, some temporary barrier materials are suitable for use in step 201 (temporary material emplacement) but would be difficult or impossible to use in step 103 (temporary material injection). Otherwise similar materials may be used for either process.

Partial Coating Using an Injection Guided by Both Multipath Structure and Temporary Barriers The methods 100 and 200 can both be used in a single process to provide additional control over the catalyst distribution. An example motivating the combination of these methods is a partially coated catalyst for use as a pre-combustor in a system in which the flow to the pre-combustor is invariably non-uniform. For example, it may be found that the flow tends toward a parabolic distribution wherein the central channels are subject to a higher flow rate than the outer channels. Because the flow rate is less in the outer channels, they do not need to be coated along their entire lengths to achieve the same extent of reaction as the central channels. Coating the outer channels along only a fraction of their length will therefore avoid wasting catalyst.

The desired process therefore leaves every other channel entirely uncoated. For those channels that are coated, the central ones are coated along their entire length, but the outer ones are coated along only a part of their length.

Figure 20:
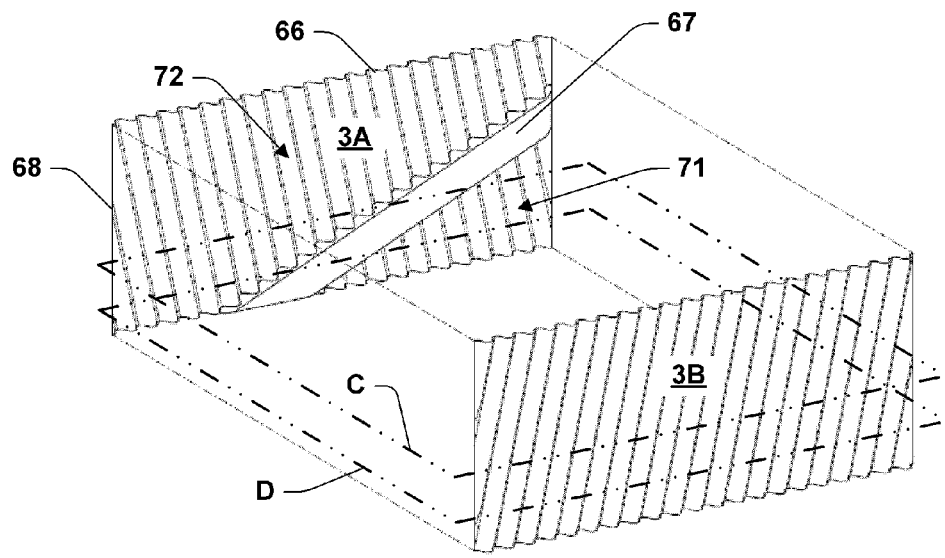
FIG. 20 illustrates two corrugated foils being laid together with a wax strip between the foils.

Method 300 provides a process for achieving the desired catalyst distribution. The process combines methods 100 and 200. Process 300 begins by providing a multipath monolith as described for the multipath injection method 100 (steps 111-114) with the addition of wax placement as in step 201 of process 200. The wax is placed in a strip as illustrated in FIG. 20 by the wax strip 67 on corrugated foil 3A. Another corrugated foil 3B is placed on the first foil 3A with the corrugations at cross-angles. These foils are joined by crushing and brazing along edge 68. The foils are then rolled together into a monolith shape 69 illustrated by FIGS. 21 and 22. The outer edges of the foils 3A and 3B are crushed and braised against the perimeter of the monolith 69 at position 70. These are essentially the same as steps 112 to 114 of method 100.

The resulting monolith is the monolith substrate 69. The substrate 69 has internally connected regions 76 and 77, which are isolated from one another. The wax 67 blocks one end of region 77 from access from the end of the monolith 69 corresponding to edge 66 of foil 3A. The blocked region corresponds to area 71 of foil 3A. The unblocked region corresponds to area 72.

Figure 21:
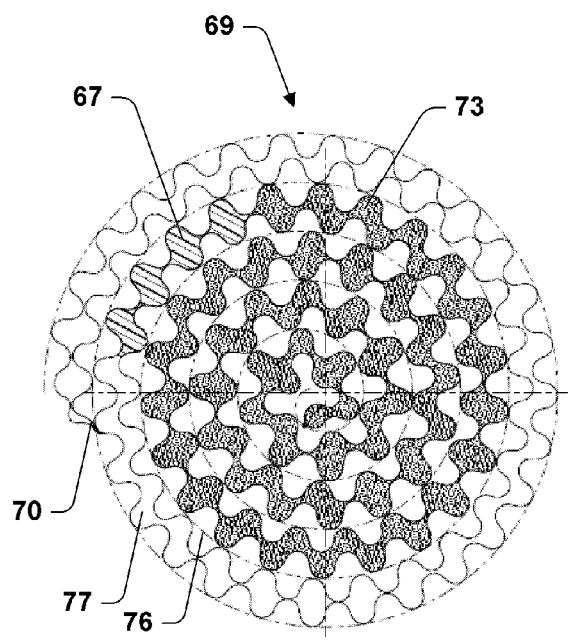
FIG. 21 is a cross-section along plane C of FIG. 20 after the foils have been rolled together to form a monolith.
Figure 22:
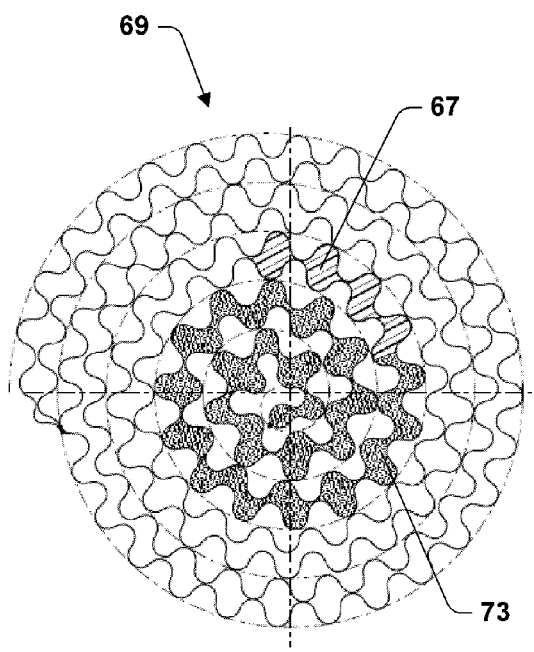
FIG. 22 is a cross-section along plane D of FIG. 20 after the foils have been rolled together to form a monolith.

After the monolith is rolled, the blocked portion has a parabolic distribution. This is difficult to see at first, but is illustrated by FIGS. 21 and 22. FIG. 21 corresponds to cross-section C of FIG. 21, whereas FIG. 22 corresponds to cross-section D. The darkened areas 73 correspond to those parts of region 77 that will be filled with injected material. The hatched areas correspond to the wax 67. Unmarked areas within the monolith 69 correspond to either the portion of region 77 that will not become filled by injection or to region 76.

Process 300 proceeds as in method 100, using method 130 (or 140) for step 131. The monolith 69 is clamped between pads 22 and 23. A catalysts sol is injected into region 77 through ports 24 in the pad 22. Whereas the injected sol penetrates all the way through region 77 to the opposite pad 23 near the center of the monolith 69, its extent of penetration of region 77 is blocked by the wax 67 in channel proximate the perimeter of the monolith 69.

Conceivably, temporary barriers built into a monolith may be used to eliminate the need for one or both of the sealing pads 22 and 23 of method 100. Suitably placed, the temporary barriers block off the channels at the ends, for example the ends 17 and 18 of monolith 11. Injection ports can be formed through the temporary barrier material. The use of sealing pads 22 and 23, however, is preferred. One disadvantage of using temporary barrier materials to block off the ends 17 and 18 for step 103 is that barrier material at the ends of the channels blocks endmost portions of the channels in which coating is desired. In process 300, using pads 22 and 23 also provides the benefit of preventing the temporary barrier material 67 from being displaced out of the channels by the pressure used to drive the injection.

In terms of scale and materials, the monoliths catalysts made by the process of the invention are generally adapted for and used in diesel exhaust treatment systems, especially power generation systems adapted for and used in medium and heavy duty trucks. Accordingly, the monolith catalysts generally have a frontal area from about 12 to about 140 square inches. The monolith channels generally have an average hydraulic diameter from about 0.5 to about 5.0 mm. These dimensions and uses relate to the selection of the catalyst and substrate materials, the packaging of the monolith catalysts, and the apparatus for carrying out the processes described herein.

The invention as delineated by the following claims has been shown and/or described in terms of certain examples. While a particular component or feature may have been described in only one example, or broadly described in one example but narrowly in another, the components or features in their broad or narrow descriptions may be combined with those of other examples where such combinations would be recognized by one of ordinary skill in the art as within the scope of what the applicants have invented.

The invention claimed is:

1. A method of manufacturing a partially catalyst-coated metal-substrate monolith, comprising the steps of:
    obtaining a multipath monolith substrate that is the product of a process comprising:
    obtaining one or more metal foils;
    texturing at least one of the foils to form corrugations; and
    folding, stacking, or rolling the foils to form them into a layered structure having open space between the foil layers and an overall monolith shape, the monolith shape having two opposing open ends along which edges of the foils are exposed and a perimeter closing the volume between the open ends;
    closing off the open ends of the monolith by pressing pads against them, the pads contacting the edges of the foils including contact on edge locations that are not on the perimeter;
    injecting material through one or more ports in the pads into space within the monolith, the space accessing a portion of the interior of the monolith limited to from about 10 percent to about 90 percent of the open space between layers, the remaining open space within the monolith being inaccessible from the one or more ports;
    contacting monolith surfaces bounding the accessed open space with the injected material while not contacting any of the monolith surfaces bounding the inaccessible open space with injected material; and
    selectively coating a portion of the monolith with a catalyst composition, the selectivity being defined by either selection to the surfaces contacted by the injected material or by exclusion from the surfaces contacted by the injected material;
    wherein the one or more ports are no more than ten, and the material is not injected into the remaining open space within the monolith that is inaccessible from the one or more ports;
    wherein the multipath monolith comprises flow paths defined by the corrugations and wherein the flow paths are interconnected.

2. The method of claim 1, wherein the one or more ports are four or fewer.

3. The method of claim 1, wherein the one or more ports are a single injection port.

4. The method of claim 1, further comprising the step of providing the pads with exit ports that operate during the injection process to relieve pressure from the monolith interior.

5. The method of claim 4, wherein the number of exit ports is at least one greater than the number of injection ports.

6. The method of claim 1, wherein injecting material into the monolith makes the coating selective by preventing coating of some surfaces during the coating step.

7. The method of claim 1, wherein the injected material substantially fills the space accessible from the one or more ports and the selective coating step uses a non-selective coating process.

8. The method of claim 1, selectively coating a portion of the monolith with a catalyst composition comprises dipping the monolith substrate in a catalyst coating composition or drawing or pouring the catalyst coating composition through one of the ends of the monolith without picking out individual channels.

9. The method of claim 1, wherein injecting material through one or more ports comprises injecting a catalyst slurry or solution into the monolith.

10. The method of claim 1, wherein injecting material through one or more ports comprises injecting a foam that carries a catalyst that is deposited on the surfaces of the monolith channels.

11. The method of claim 1, wherein the monolith substrate comprises adjacent layers of corrugated foil, the adjacent layers of corrugated foil lying against one another in a position that the corrugations do not intermesh.

12. The method of claim 1, wherein the step of obtaining the monolith comprises forming the monolith with built-in temporary barriers that fills between adjacent layers and thereby limits limit the volume accessible from the space into which the injection is made.

13. The method of claim 1, wherein the obtaining a multipath monolith comprises laying corrugated foil against one another with the corrugations at cross angles.

14. The method of claim 1, wherein the multipath monolith has a greater number of openings at one end than fluidly isolated channels within its interior.

15. The method of claim 1, wherein adjacent foils of the multipath monolith make contact that is point-wise rather than line-wise.

16. The method of claim 1, wherein the space within the monolith into which the material is injected consists of a single interconnected volume.

17. The method of claim 1, wherein the open space between layers consists of two fluidly isolated volumes.

18. A method of manufacturing a partially catalyst-coated monolith, comprising the steps of:
   forming a monolith substrate by a process comprising:
      obtaining one or more sheets;
      texturing at least one of the sheets to form corrugations;
      emplacing a temporary barrier material adjacent to at least one of the sheets;
      folding, stacking, or rolling the one or more sheets to form them into a layered structure having open space between layers, the open space resulting from the corrugations, the layered structure having an overall monolith shape, the monolith shape having two opposing open ends along which edges of the sheets are exposed and a perimeter closing the volume between the open ends;
      wherein the temporary barrier material is emplaced to fill between adjacent layers and thereby block access to some of the volume between the open ends;
   coating a limited portion of the monolith substrate with a catalyst composition, wherein the extent of coating is limited at least in part by the temporary barrier material; and
   removing the temporary barrier material from the monolith;
   wherein coating is limited to surfaces of the substrate bounding from about 10 percent to about 90 percent of the space between layers;
   wherein the monolith substrate is a multipath monolith substrate and the coating step comprises placing the monolith between pads that seal off the ends of the monolith and injecting material into the substrate through one or more ports in the pads;
   wherein the temporary barrier material is positioned to block access to a greater portion of the open volume than the volume filled by the temporary barrier material;
   wherein the multipath monolith comprises flow paths defined by the corrugations and wherein the flow paths are interconnected.

* * * * *